(12) United States Patent
Quinn et al.

(10) Patent No.: US 11,788,644 B2
(45) Date of Patent: Oct. 17, 2023

(54) PROPORTIONAL VALVE, ELECTRIC SHOWER INCORPORATING THE PROPORTIONAL VALVE AND TAP INCORPORATING SAME

(71) Applicants: Hydralectric Group Ltd, Surrey (GB); EKI D.O.O., Crnomelj (SI)

(72) Inventors: Michael Quinn, Surrey (GB); Anton Stefanic, Suhor (SI)

(73) Assignees: Hydralectric Group Ltd, Surrey (GB); EKI D.O.O., Crnomelj (SI)

( * ) Notice: Subject to any disclaimer, the term of this patent is extended or adjusted under 35 U.S.C. 154(b) by 158 days.

(21) Appl. No.: 15/532,545

(22) PCT Filed: Dec. 2, 2015

(86) PCT No.: PCT/GB2015/053680
§ 371 (c)(1),
(2) Date: Jun. 2, 2017

(87) PCT Pub. No.: WO2016/087849
PCT Pub. Date: Jun. 9, 2016

(65) Prior Publication Data
US 2017/0363224 A1 Dec. 21, 2017

(30) Foreign Application Priority Data
Oct. 2, 2015 (GB) ..................................... 1517469

(51) Int. Cl.
*F16K 31/40* (2006.01)
*G05D 7/00* (2006.01)

(52) U.S. Cl.
CPC ........... *F16K 31/404* (2013.01); *G05D 7/005* (2013.01)

(58) Field of Classification Search
CPC .............................. F16K 31/404; G05D 7/005
(Continued)

(56) References Cited

U.S. PATENT DOCUMENTS 3,407,845 A 10/1968 Cooksley
4,635,683 A † 1/1987 Nielsen
(Continued)

FOREIGN PATENT DOCUMENTS

DE 19545532 A1 † 6/1996
DE 20000165 U1 5/2001
(Continued)

*Primary Examiner* — Marina A Tietjen

(57) ABSTRACT

A proportional valve is provided that comprises an input port (3) and an output port (5), with a diaphragm (19) therebetween. A diaphragm plate (21) with a pilot orifice (31) formed therethrough is mounted to the diaphragm (19). The valve has a solenoid (7) comprising an armature (15) and a field winding (17), with the armature being movable in an opening direction in response to a magnetic field generated by the field winding. A spring assembly (13) is arranged to provide a biasing force to the armature (15) in its closing direction. In its closed position, the diaphragm plate (21) sits in a main orifice (20) between the input and output ports to block flow of fluid therebetween, with the armature (15) blocking the pilot orifice (31). Opening movement of the armature (15) opens the pilot orifice (31) to allow fluid to flow therethrough, in turn allowing the diaphragm plate (21) to move out of the main orifice (20) to create a gap allowing flow of fluid from the input port (3) to the output port (5). The diaphragm plate (21) and main orifice (20) are configured such that in at least the initial opening movement of the diaphragm plate, the rate of increase of the gap between them changes approximately linearly.

15 Claims, 6 Drawing Sheets

(58) Field of Classification Search
USPC .............................................. 251/30.01–30.5
See application file for complete search history.

(56) References Cited

U.S. PATENT DOCUMENTS

| | | | | |
|---|---|---|---|---|
| 4,793,589 A | * | 12/1988 | Eldredge | ............... F16K 31/408 |
| | | | | 137/625.3 |
| 4,860,990 A | † | 8/1989 | Fukuzawa | |
| 5,231,722 A | * | 8/1993 | Shacklock | .............. D06F 33/02 |
| | | | | 137/387 |
| 6,017,015 A | * | 1/2000 | Heusser | .................... B66F 9/22 |
| | | | | 251/30.04 |
| 6,265,957 B1 | * | 7/2001 | Baginski | ............... H01F 7/1607 |
| | | | | 335/251 |
| 6,854,703 B2 | * | 2/2005 | Parker | .................. F02M 57/025 |
| | | | | 251/30.01 |
| 7,703,740 B1 | † | 4/2010 | Franklin | |
| 8,936,041 B2 | * | 1/2015 | Yun | ....................... F16K 31/082 |
| | | | | 137/613 |
| 2012/0012769 A1 | * | 1/2012 | Ambrosi | ................. B60T 8/363 |
| | | | | 251/129.15 |

FOREIGN PATENT DOCUMENTS

| | | | |
|---|---|---|---|
| DE | 202006018084 U1 † | 3/2007 | |
| DE | 102011087553 A1 | 6/2013 | |
| EP | 0489331 A † | 6/1992 | |
| EP | 0489331 A1 | 6/1992 | |
| EP | 1431640 A1 | 6/2004 | |
| WO | WO8902557 | 3/1989 | |
| WO | 2013/118050 A1 † | 8/2013 | |
| WO | WO-2015086253 A1 * | 6/2015 | ........... F16K 31/404 |

\* cited by examiner
† cited by third party

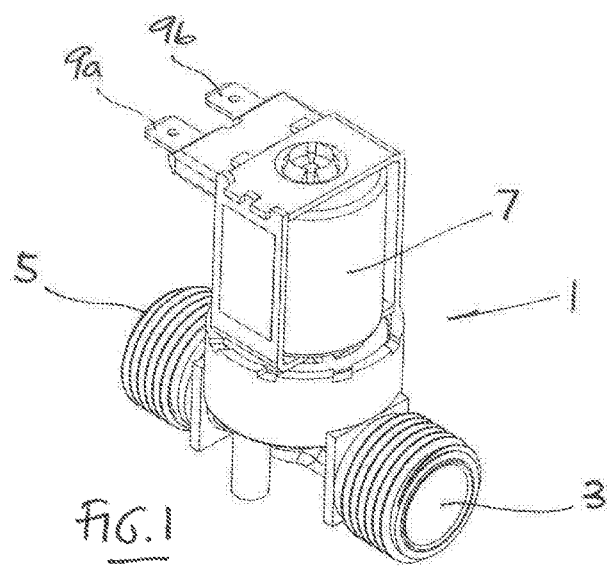
fig.1
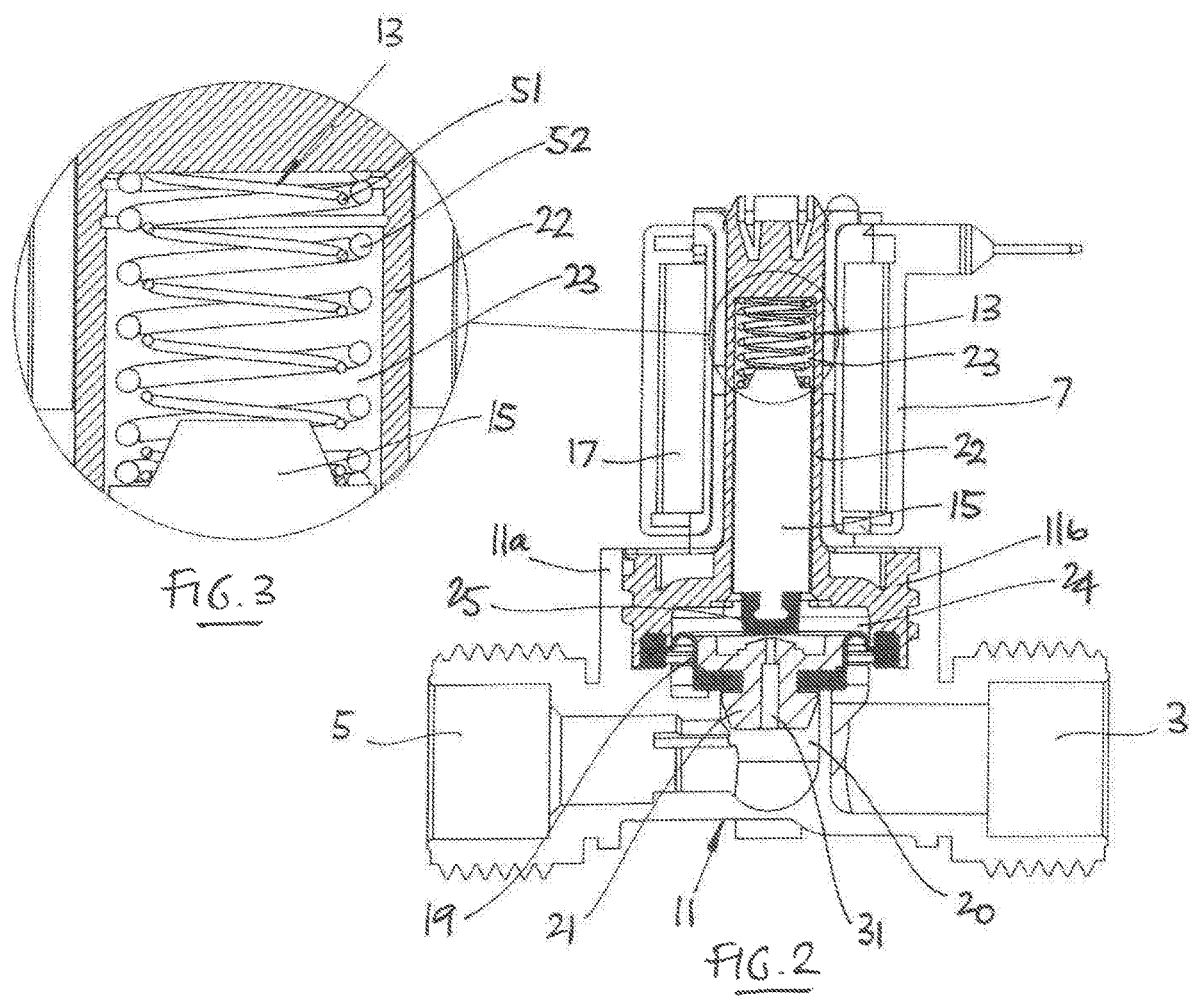
fig.3
fig.2

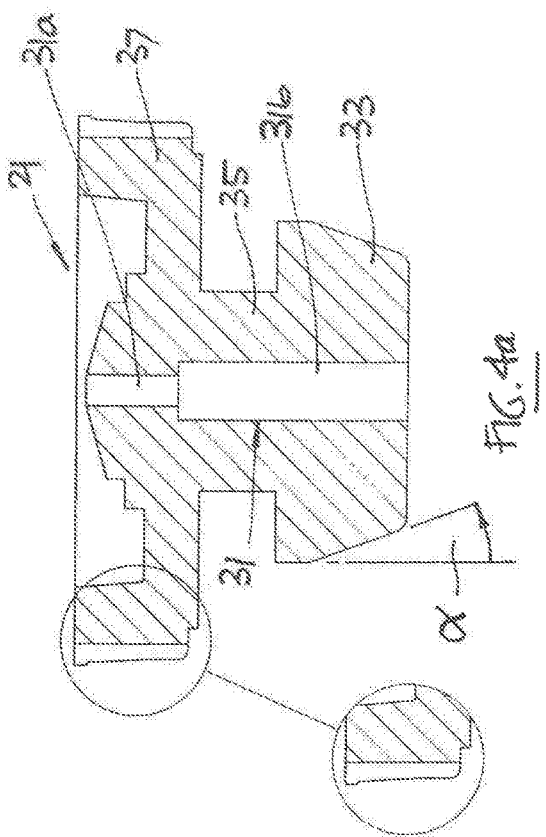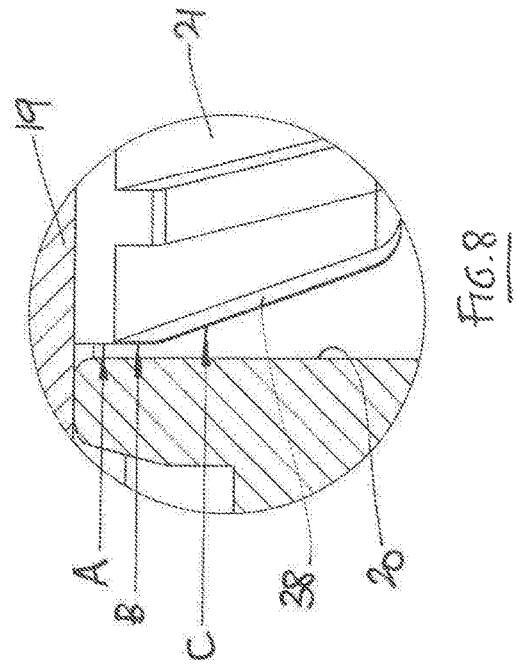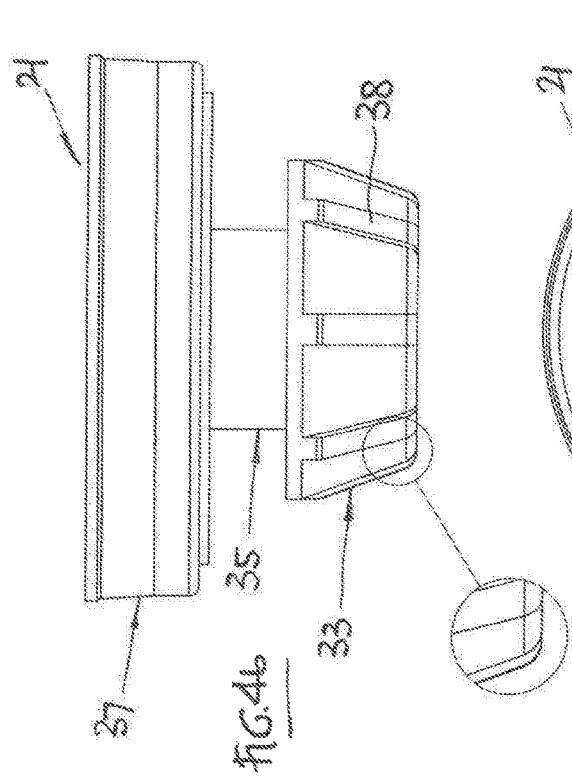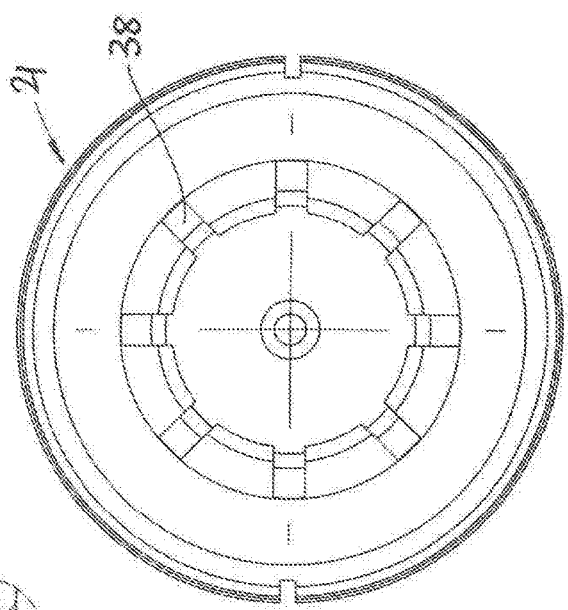

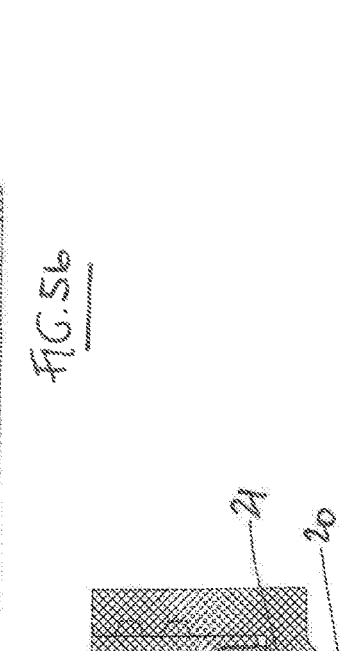
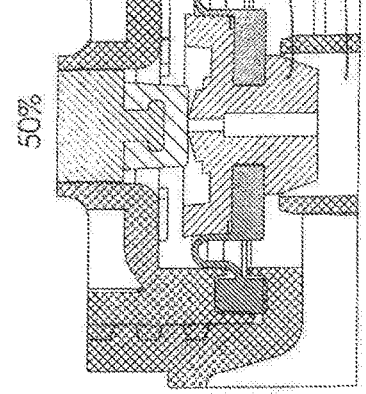
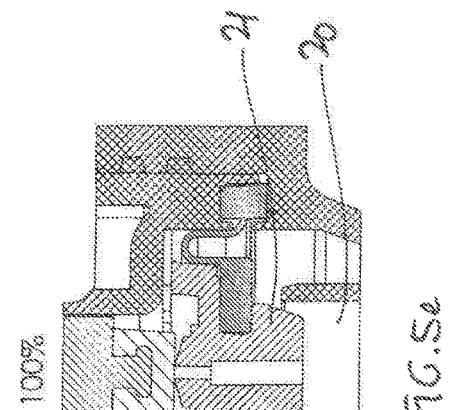
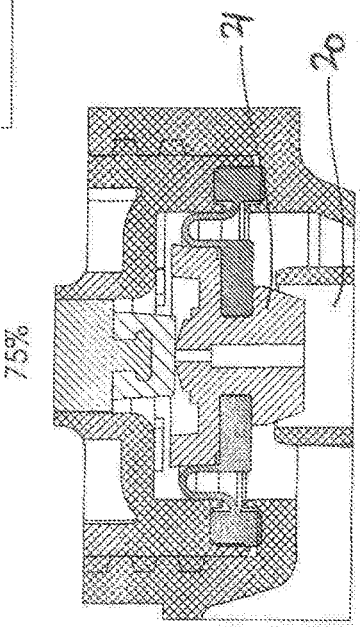

| ZONE | HEIGHT | DISPLACEMENT /% | FLOW AREA |
|---|---|---|---|
| A | 0.05375 | 2.5 | 4.1705 |
| | 0.1075 | 5 | 4.1705 |
| | 0.16125 | 7.5 | 4.1705 |
| | 0.215 | 10 | 4.1705 |
| | 0.26875 | 12.5 | 4.1705 |
| | 0.3225 | 15 | 4.1705 |
| | 0.37625 | 17.5 | 4.1705 |
| B | 0.43 | 20 | 4.2953 |
| | 0.48375 | 22.5 | 4.6917 |
| | 0.5375 | 25 | 5.0858 |
| | 0.59125 | 27.5 | 5.4777 |
| | 0.645 | 30 | 5.8672 |
| | 0.69875 | 32.5 | 6.2545 |
| | 0.7525 | 35 | 6.6395 |
| | 0.80625 | 37.5 | 7.0222 |
| | 0.86 | 40 | 7.4027 |
| | 0.91375 | 42.5 | 7.8972 |
| C | 0.9675 | 45 | 8.395 |
| | 1.02125 | 47.5 | 8.8906 |
| | 1.075 | 50 | 9.384 |

PROPORTIONAL VALVE, ELECTRIC SHOWER INCORPORATING THE PROPORTIONAL VALVE AND TAP INCORPORATING SAME

This invention relates to a proportional valve which may be incorporated in an electric shower.

There are many known valves for controlling the flow of a fluid through a system. A proportional valve allows the flow rate to be varied throughout a range by varying the signal applied to a solenoid forming part of the proportional valve.

Proportional valves are known in which an input port is in fluid communication with a control chamber through small holes provided in a diaphragm. The diaphragm carries a diaphragm plate that, when positioned in a main orifice between the input port and an output port, blocks the flow path between the input port and the output port except for a pilot orifice through the diaphragm plate. The solenoid has an armature that, in the absence of a signal being applied to the field winding of the solenoid, is biased by a spring to pass through the control chamber and abut the diaphragm plate so as to move the diaphragm plate into the main orifice and to block the pilot orifice. The fluid pressure in the control chamber assists in holding the diaphragm plate in the main orifice, so that no fluid flows from the inlet port to the outlet port when no signal is applied to the field winding of the solenoid.

When a signal is applied to the field winding to move the armature away from the diaphragm plate against the spring force, fluid is able to pass through the pilot orifice creating a pressure differential that allows the diaphragm plate to lift out of the main orifice so that fluid is permitted to flow between the inlet port and the outlet port through the main orifice. In particular, the diaphragm plate lifts out of the main orifice until the diaphragm plate abuts once again the end of the armature. The position of the end of the armature is determined by the signal applied to the field winding of the solenoid, and accordingly the gap available for fluid to flow through to the main orifice is determined by the signal applied to the field winding of the solenoid.

For an electric shower, proportional valves are desired that achieve average flows from 0.5 litres per minute to 12 litres per minute across 0.5-5 bar dynamic water pressure. A problem with known proportional valves is that under mains water pressure, at low flow rates there is an initial, transient surge of water when the valve is first opened, before a steady state flow rate is achieved. Previous attempts to address this problem have concentrated on the forces applied on the armature by the field winding of the solenoid and the spring.

After much investigation, the present inventors have determined that the diaphragm plate and/or main orifice can be shaped in such a way as to inhibit transient fluid flow peaks. For example, by reducing the size of the pilot orifice, the rate of increase in the pressure differential between the inlet port and control chamber sides of the diaphragm can be reduced, thereby slowing the lifting of the diaphragm plate out of the main orifice. Further, the part of the diaphragm plate that sits in the main orifice can be shaped so that the gap through to the main orifice increases approximately linearly with movement of the diaphragm plate.

By way of example, embodiments of the present invention will now be described in detail with reference to the accompanying drawings, in which:

FIG. 1 shows a perspective view of a proportional valve according to the invention;

FIG. 2 shows a cross-section through the valve illustrated in FIG. 1;

FIG. 3 is an enlarged detail of the spring assembly of the valve illustrated in FIG. 1;

FIG. 4a shows a cross-section through a diaphragm plate forming part of the valve illustrated in FIG. 1;

Figure 6:
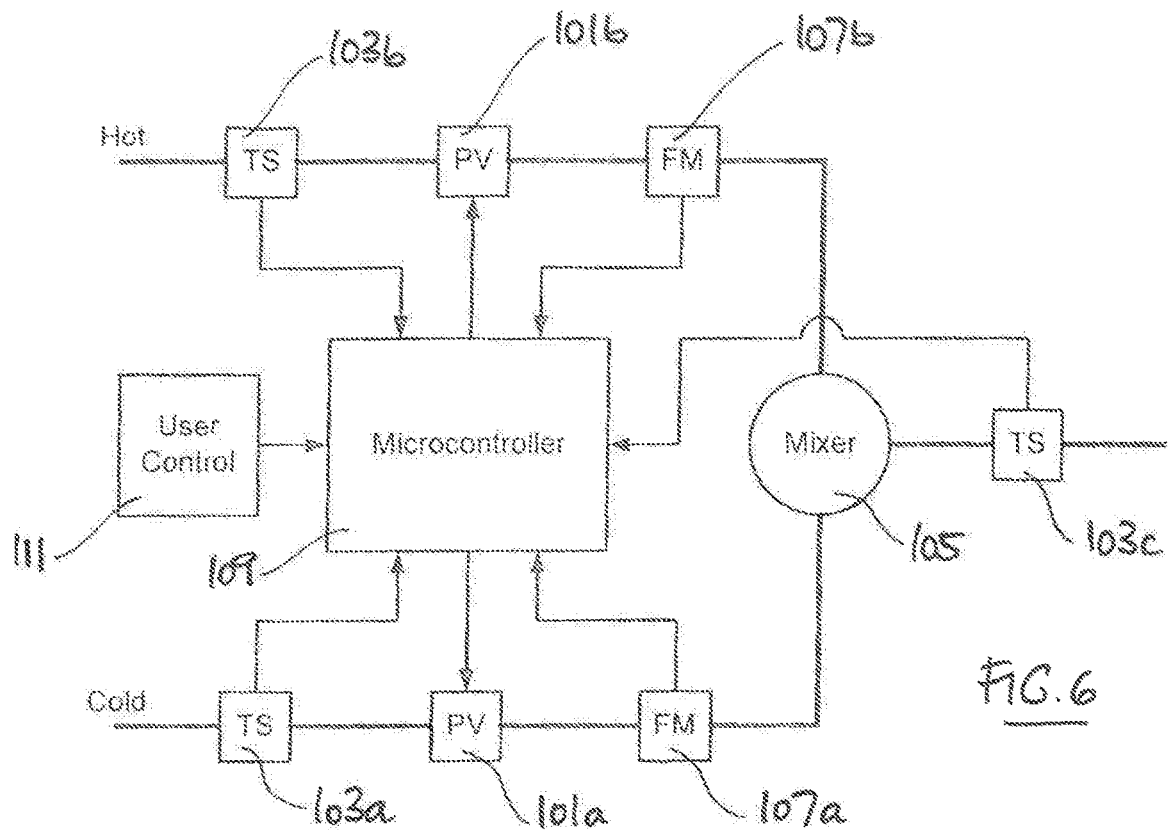
Figure 7:
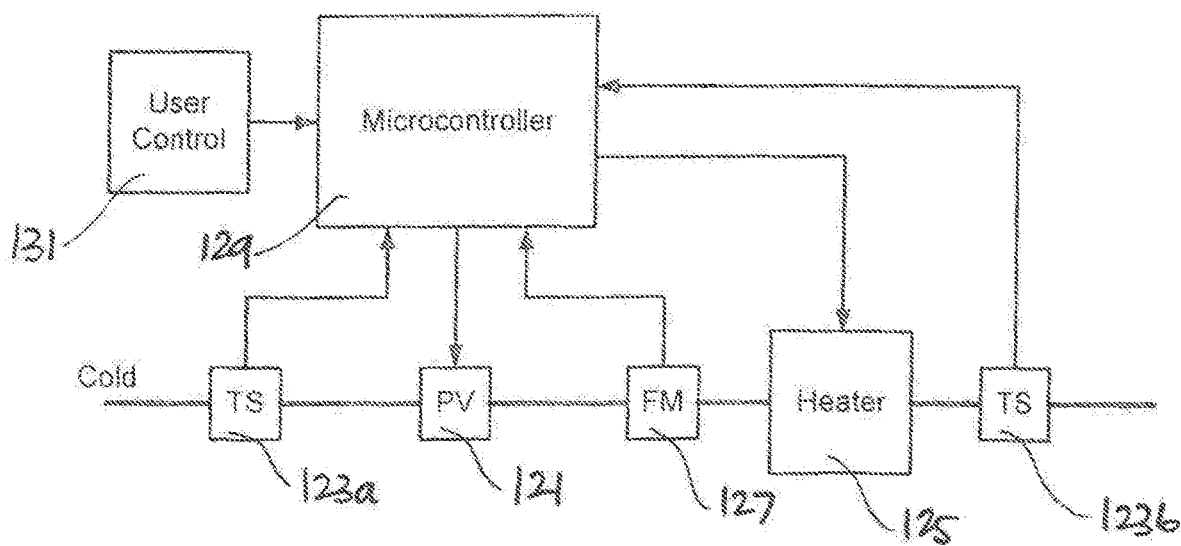
Figures 9, 10:
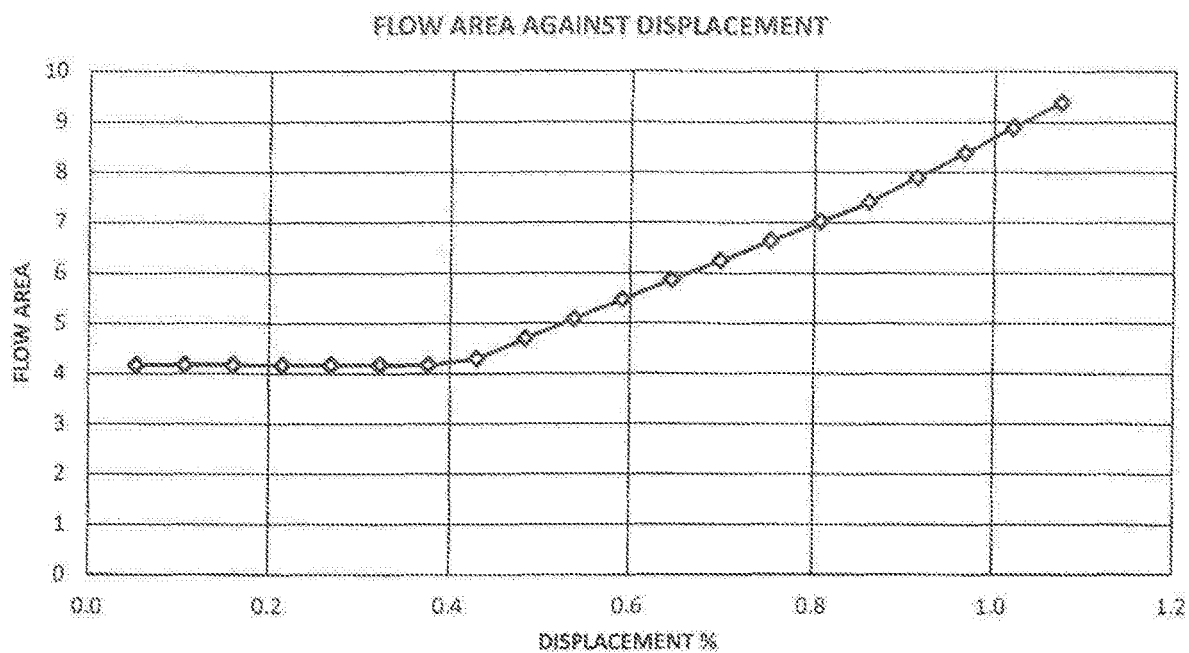
Figure 11:
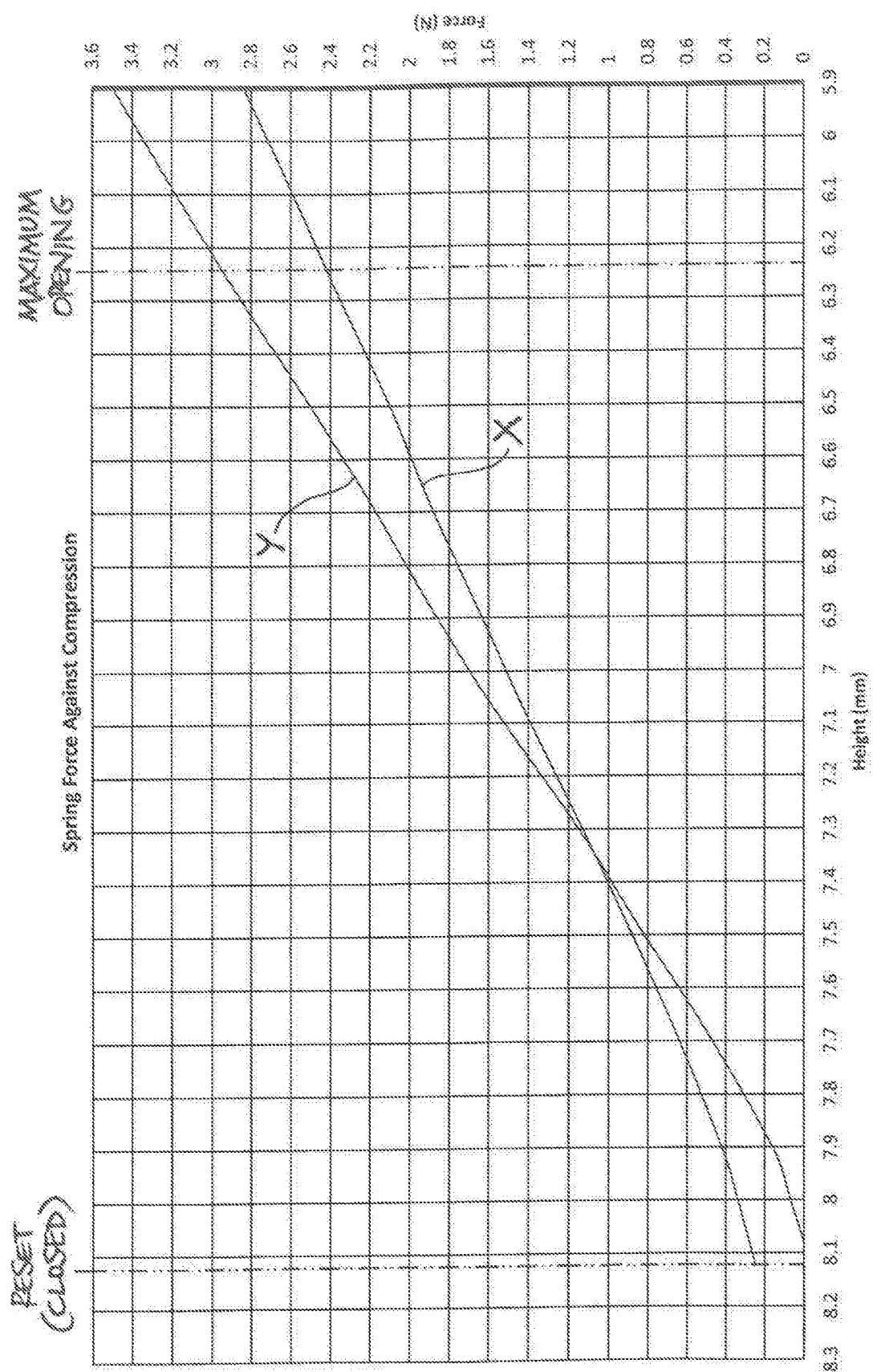

FIGS. 4b and 4c respectively show side and top views of the diaphragm plate;

FIGS. 5a to 5e show the diaphragm plate at five different positions relative to the main orifice;

FIG. 6 illustrates an electronically-controlled shower system having hot and cold inlets, in which the flow rate through each inlet is controlled by the valve of FIG. 1;

FIG. 7 shows an electronically-controlled shower system having a cold inlet feeding into a heater, in which the flow rate through the cold inlet is controlled by the valve of FIG. 1;

FIG. 8 is an enlarged detail of part of the diaphragm plate of the valve of FIG. 1;

FIG. 9 is a plot of flow area against displacement of the diaphragm plate;

FIG. 10 is a table of measurements of flow area against displacement of the diaphragm plate; and FIG. 11 is a plot of biassing force generated by the spring assembly of the valve illustrated in FIG. 1.

As shown in FIG. 1, in an embodiment of the invention a proportional valve 1 has an inlet port 3 and an outlet port 5. The valve 1 includes a solenoid 7 having electrical contacts 9a and 9b. In this embodiment, the solenoid 7 is a 24V DC 8 W solenoid. As will be discussed in more detail hereafter, the flow of liquid through the inlet port 3 of the proportional valve 1 to the outlet port 5 is controlled by an electrical signal applied to the solenoid 7 via the electrical contacts 9a, 9b.

As shown in FIG. 2, the proportional valve 1 has a housing 11 which defines the inlet port 3 and the outlet port 5, as well as defining a main orifice 20 between the inlet port 3 and the outlet port 5. The housing 11 also defines a cylindrical guide tube 22, generally aligned with the main orifice 20, along which an armature 15 of the solenoid 7 can move along the cylindrical axis. A spring chamber 23 is provided at the end of the guide tube 22 distal to the main orifice 20, and a control chamber 24 is formed at the end of the guide tube proximate the main orifice. As shown in FIG. 2, in this embodiment the housing 11 is formed of two members: the first member 11a defining the inlet port 3, the outlet port 5 and the main orifice 20; the second member 11b defining the spring chamber 23, guide tube 22 and control chamber 24. Threading provided on an internal surface of the first housing member 11a and an external surface of the second housing member 11b enable the second housing member to be screw-fitted into the first housing member. In this embodiment, the housing 11 is made from moulded plastics, in particular glass-filled nylon.

A spring assembly 13 is provided in the spring chamber 23 and applies a biasing force to one end of the armature 15 urging it towards the main orifice 20. As shown in FIG. 2, a field winding 17 of the solenoid 7 is provided around the guide tube 22 housing the armature 15. The armature 15 is made of a ferrous material so that a magnetic field generated by a current flowing through the field winding 17 exerts a force on the armature along the cylindrical axis.

In this embodiment, the armature 15 is made of magnetic stainless steel, apart from a rubber boot 25 provided at the end of the armature 15 adjacent the main orifice 20. In this embodiment, an aperture for receiving the guide tube 22 is formed through the field winding 17 having a diameter of 8.8-8.9 mm, which is a standard sizing for such a solenoid 7. The thickness of the housing portion forming the guide tube 22 is 0.75 mm, significantly less than for previous proportional valves, which allows for a larger diameter of 7 mm for the armature 15 (compared to 6 mm that is conventionally used). In this way, a stronger force can be applied to the armature 15 by current flowing in the field winding 17 than in comparison with the same current flowing in conventional proportional valves. Further, the use of magnetic stainless steel provides a comparatively low inertia system, which also assists in the controllability of the position of the armature 15 within the guide tube 22.

A small gap is provided between the armature 15 and the guide tube 22 so that the spring chamber 23 is in fluid communication with the control chamber 24. This has the advantage that any air trapped in the spring chamber 23 can dissipate through the valve 1, and therefore no bleed arrangement need be provided. Those skilled in the art will appreciate that this is particularly advantageous when the valve has been in use, where a gas build-up in the spring chamber 23 would otherwise require bleeding and recalibration of the valve, such recalibration in many circumstances being unfeasible.

A flexible diaphragm 19 is mounted in the housing 11 between the first housing member 11a and the second housing member 11b, so that the inlet port 3, outlet port 5 and main orifice 20 are on one side of the diaphragm 19 and the control chamber 24 and armature 15 are on the other side of the diaphragm 19. Several small holes are provided in the diaphragm 19 to allow liquid to move from the inlet port 3 into the control chamber 24. The diaphragm 19 carries a rigid diaphragm plate 21. As will be described hereafter, the positional relationship between the diaphragm plate 21 and the main orifice 20, which is controlled by the current flowing in the field winding 17, determines the flow rate through the valve 1.

A pilot orifice 31 is formed through the centre of the diaphragm plate 21, and is generally aligned with the cylindrical axis of the guide tube 22 which guides the movement of the armature 15. As such, in the absence of current in the field winding 17, the spring assembly 13 urges the armature 15 against the diaphragm plate 21, both inserting the diaphragm plate 21 into the main orifice 20 and blocking the pilot orifice 31 with the rubber boot 25. In this way, fluid flow between the inlet port 3 and the outlet port 5 is blocked. Further, fluid in the control chamber 24 applies pressure on the diaphragm 19 and diaphragm plate 21 that assists in holding the diaphragm plate 21 in the main orifice 20.

When a current flows in the field winding 17 in a direction that exerts a force on the armature 15 counter to the force of the spring assembly 13, the armature 15 lifts away from the diaphragm plate 21, thereby opening the pilot orifice 31. Subsequent movement of liquid through the pilot orifice 31 generates a pressure differential between the inlet port 3 and the control chamber 24, resulting in the diaphragm 19 lifting the diaphragm plate 21 out of the main orifice 20 to a position where the diaphragm plate 21 again abuts the armature 15. In this way, liquid is allowed to flow through the main orifice 20.

In conventional proportional valves, when the diaphragm plate 21 first lifts from its seat within the main orifice 20, a sudden flow of liquid through the main orifice applies an impulsive force to drive the diaphragm plate 21 into the armature 15, causing the diaphragm plate 21 and armature 15 to move further against the biassing force of the spring assembly 13. This additional movement of the diaphragm plate 21 leads to a temporary surge in the flow rate through the valve until equilibrium is established between the magnetic force and the spring force on the armature 15. Previous attempts to address this problem have concentrated on the solenoid design. The present invention arises from the realisation that by careful design of the diaphragm plate 21 and the way that the diaphragm plate 21 sits in the main orifice 20, the sudden inflow of liquid through the main orifice as the diaphragm plate 21 lifts can be ameliorated. In particular, in previous proportional valves, the flow of liquid through the main orifice 20 typically increased exponentially with movement of the diaphragm plate 21 along the axis of movement of the armature. In contrast, for a valve according to an embodiment of the invention, the flow of liquid through the main orifice 20 can increase generally linearly with movement of the diaphragm plate 21 along the axis of movement of the armature 15.

The diaphragm plate 21 will now be described in more detail with reference to FIGS. 4a to 4c. As shown in FIG. 4a, the cross-section of the diaphragm plate 21 has three portions: an inverted frusto-conical portion 33, a neck portion 35 and a top portion 37. The pilot orifice 31 has a narrow diameter portion 31a within the top portion 37 and a wider diameter portion 31b through the neck portion 35 and the top portion 37. In this embodiment, the diameter of the narrow portion 31a of the pilot orifice is 0.75 mm, which is significantly less than that of pilot orifices for conventional proportional valves. This means that the rate of increase of the pressure differential when the pilot orifice 31 is first opened is less than for conventional proportional valves, which helps reduce the speed of movement of the diaphragm plate 21 and accordingly the rate of increase in the liquid flow through the main orifice. To prevent blocking of the pilot orifice 31 by particulates, an inlet filter (not shown) having a mesh size of 0.2 mm is used. The diameter of the wider portion 31b of the pilot orifice is 1.5 mm. This offset in diameter between the narrow portion 31a and the wider portion 31b of the pilot orifice 31 assists in the moulding process for the diaphragm plate 21.

The diaphragm 19 is fitted around the neck portion 35 of the diaphragm plate 21, with the frustoconical section 33 on the main orifice side of the diaphragm and the top portion 37 on the control chamber side of the diaphragm 19. The main part of the conical surface of the frusto-conical section 33 is sloped at an angle α of 39°, in contrast to previous diaphragm plates which typically slope away at a much larger angle apart from a number of radial guide fins. The depth of the frusto-conical section is 3.25 mm, significantly shorter than previous diaphragm plates. As seen in FIG. 4b, a series of ribs 38 are evenly spaced about the conical surface of the frusto-conical section 33, in this case eight. Each rib 38 has the same, substantially constant, depth. As well as reducing the possibility of the diaphragm plate 21 sticking in the main orifice, these ribs 38 further restrict the flow path for liquid to flow through the main orifice at low flow rates.

The precise shape and configuration of the frusto-conical portion 33 of the diaphragm plate 21 and of the ribs 38 is seen in greater detail in FIG. 8. At its root adjacent to the diaphragm 19, the diaphragm plate 21 presents a plain cylindrical surface, indicated by the letter A in FIG. 8, extending parallel to the axis of the main orifice 20. From there, the surface of the diaphragm plate 21 extends away at an angle to produce its characteristic frusto-conical form. The ribs 38 start at the junction of these two surfaces and initially extend parallel to the axis of the main orifice 20, flush with the plain cylindrical surface of the diaphragm plate 21, indicated in FIG. 8 by the letter B. After a short distance, the ribs 38 turn and follow a path parallel to the frusto-conical surface of the diaphragm plate, but spaced from it, indicated in FIG. 8 by the letter C.

It will be understood that this particular configuration of the ribs 38 will effect a variable rate of change of the annular space between the diaphragm plate 21 and the main orifice 20 as the diaphragm plate is drawn out of it. This is deliberate and advantageous, because it can be designed to more closely mimic the ideal configuration which would bring about a linear rate of change of the annular gap. The gap between the diaphragm plate 21 and the main orifice 20 varies in proportion to the square of the diameter, which implies that the ideal shape for the diaphragm plate would in fact be a parabolic curve, rather than frusto-conical.

FIGS. 5a to 5e show the position of the diaphragm plate 21 as it moves from the reset position, in which the main orifice 20 is closed, to a position in which the diaphragm plate is at the other end of its range of movement and the main orifice is fully open. Table 1 below gives details of the main orifice 20 cross-section and extent of openness of the main orifice for the five positions of the diaphragm plate 21 shown in FIGS. 5a to 5e. It can be seen from the values given in Table 1 below that the cross-sectional area varies approximately linearly with the position of the diaphragm plate 21. This is significantly different from conventional proportional valves, in which the cross-sectional area increases exponentially with movement of the diaphragm plate.

TABLE 1

Variation of main orifice flow parameters with position of diaphragm plate

| Diaphragm Position (% of top position) | Orifice Cross-Sectional Area (mm$^2$) | Proportion of being fully open | Difference |
| --- | --- | --- | --- |
| 0 | 0 | 0 | — |
| 25 | 6.19 | 33.0% | 33.0% |
| 50 | 10.25 | 54.6% | 21.6% |
| 75 | 14.61 | 77.8% | 23.2% |
| 100 | 18.77 | 100% | 22.2% |

As discussed above, the diaphragm plate 21 in this embodiment differs from those of conventional proportional valves in two main ways. Firstly, the pilot orifice 31 is narrower, which slows down the rate of increase in the pressure differential. Secondly, the portion of the diaphragm plate 21 that sits in the main orifice 20 is shaped so that the cross-sectional area available for fluid flow increases substantially linearly with movement of the diaphragm plate 21 out of the main orifice. These differences contribute to providing a significant improvement in the controllability of the flow rate through the valve in comparison with conventional valves, in particular by inhibiting transient liquid flow peaks through the output port 5 in response to initial unblocking of the main orifice 20.

A plot of the rate of change of the annular gap between the diaphragm plate 21 and the main orifice 20, ie the flow area for passage of water, in the earlier stages of opening is seen in FIG. 9. The initial part of the plot represents the phase of withdrawal of the diaphragm plate 21 indicated by the letter A in FIG. 8. The remainder of the plot represents the phases of withdrawal indicated by the letters B and C in FIG. 8, and it can be seen how this varies in a substantially linear manner. Measurements taken for an embodiment of the valve with this configuration are shown in FIG. 10.

The proportional valve of this embodiment was designed for use in an electronically controlled shower system with signal voltage proportional to the target flow, thereby providing control of hot and or cold water flows. As such, the invention encompasses an electric shower including such proportional valves.

As shown in FIG. 6, in one embodiment the electronically-controlled shower hot water and cold water are mixed, with the flow rates of the hot and cold water being controlled by a proportional valve as described above. In particular, cold water flows from a cold water inlet to a first proportional valve 101a via a first temperature sensor 103a. The output of the first valve 101a flows to a mixing chamber 105 via a first flow meter 107a. Similarly, hot water flows from a hot water inlet to a second proportional valve 101b via a second temperature sensor 103b. The output of the second valve 101b flows to the mixing chamber 105 via a second flow meter 107b. The first and second temperature sensors 103a, 103b and the first and second flow meters 107a, 107b are connected to a microcontroller 109. A user control 111, via which the user of the shower indicates desired temperature and flow rate, is also connected to the microcontroller 109. An algorithm within the microcontroller 109 calculates, based on the user-desired temperature and flow rate and the respective temperatures of the cold water and the hot water, required flow rates through the valves 101a, 101b and send control signals to the solenoids of the valves 101a, 101b to achieve those flow rates, as measured by the flow meters 107a, 107b. Optionally, the output of the mixing chamber 105 can be fed to the shower head (not shown) via a third temperature sensor 103c to verify that the temperature of the water supplied to the shower head matches the user-desired temperature.

As shown in FIG. 7, in another embodiment the electronically-controlled shower heats cold water to a desired temperature, with the flow rate of the cold water being controlled by a proportional valve as described above. In particular, cold water flows from a cold water inlet to a proportional valve 121 via a first temperature sensor 123a. The output of the valve 121 is directed to a heater 125 via a flow meter 127. The first temperature sensor 123a and the flow meter 127 are connected to a microcontroller 129. A user control 131, via which the user of the shower indicates a desired temperature and flow rate, is also connected to the microcontroller 129. An algorithm within the microcontroller 129 calculates, based on the user-desired temperature and the temperature of the cold water and the user-desired flow rate, a required flow rate through the valve 121 and a required heating power by the heater 125. The microcontroller then sends a heater control signal to the heater to activate one or more heating elements to achieve the desired heating power, and a control signal to the valve 121 to achieve the desired flow rate, as measured by the flow meter 127. The temperature of the water output by the heater is measured using a second temperature sensor 123b, as the microcontroller 129 can only provide coarse control of the heater 125. To provide fine temperature control, the microcontroller 129 varies the control signal to the valve 121 to achieve the desired temperature.

A feature of the proportional valve described above is that in addition to providing proportional flow control over 0.5-5 bar dynamic pressure, a simple on/off operation can take place as low as 0.2 bar static pressure. This means that it is not necessary to incoroporate separate on/off valves in the electronically-controlled showers in addition to the proportional valves.

MODIFICATIONS AND FURTHER EMBODIMENTS

As discussed with reference to FIGS. 6 and 7 above, a proportional valve as described above can be incorporated within an electronically-controlled shower to control the flow and temperature of water supplied to a shower head. Alternatively, the proportional valve can be incorporated into a tap or faucet. For a mixer tap, an arrangement analogous to that of FIG. 6 or that of FIG. 7 could be used. In alternative embodiments, a hot tap or a cold tap may include a single proportional valve as described above.

In the specific embodiment described above, the pilot orifice 31 has a portion with a diameter of 0.75 mm, which was found to be generally optimal. Improvements can, however, be achieved with pilot orifices having a diameter of less than 0.8 mm. Generally, the mesh size of the inlet filter should be less than 250 µm.

While the cone angle of the frusto-conical section 33 of the diaphragm 19 in the embodiment described above is 39°, improvements can also be obtained with cone angles generally in the region of 30° to 45°.

In conventional proportional valves, the biasing force for the armature is typically provided by a single constant-rate spring. In a further improvement on conventional design, the armature 15 here is arranged to be biassed by means of a spring assembly 13 consisting of two springs 51, 52, rather than by a single spring. As seen in FIG. 3, the spring assembly 13 is arranged within the spring chamber 23, as with the single spring of a conventional valve. The two springs 51, 52 are of different lengths and spring rates. They are also formed of different diameter coils, so that one is able to fit conveniently within the other (in this case, the longer spring 51 fitting inside the shorter one 52). Both springs 51, 52 have linear spring rates, with the longer one 51 having a lower spring rate than the shorter one 52, which is stiffer. The longer spring 51 is installed in the spring chamber 23 so as to exert pre-compression on the armature 15. This is to ensure that the armature 15 will seat against the diaphragm plate 21 in the de-energised condition of the valve in any orientation, ie whether the valve 1 sits in a horizontal, vertical or otherwise inverted plane. The seating of the armature 15 on the diaphragm plate 21 is necessary to ensure that the pilot orifice 31 will remain closed off when the valve is de-energised. In this de-energised condition of the valve 1, the shorter spring 52 exerts no biasing force on the armature 15.

FIG. 11 shows in plot X how the biassing force applied by the spring assembly 13 varies with the position of the armature 15, as compared with plot Y for a conventional spring arrangement. As will be seen, the biassing force acting on the armature 15 is generally at a lower spring rate than in a conventional valve.

With the spring assembly 13, when the solenoid 7 is energised, the initial movement of the armature 15 will be resisted mostly by the softer spring 51. This corresponds to the initial movement of the diaphragm plate 21 out of the main orifice 20 from its reset (ie closed) position. It may also apply to small movements of the diaphragm plate 21 during lower flow rates through the valve. It has been found that the use of a softer than usual spring resistance reduces the tendency for the diaphragm plate 21 to oscillate, thus helping to regularise its movement. Further opening movement of the diaphragm plate 21, when there are higher flow rates through the valve, is mostly controlled by the biassing action of the stiffer spring 52. The application of two spring rates has been found to help break up resonance and enhance flow stability compared with conventional single spring arrangements. Also, by reducing resonance in the system, wear on the rubber boot 25 attached to the tip of the armature 15 caused by abrasion against the diaphragm plate 21 is reduced, improving life expectancy.

It will be appreciated that the configuration and characteristics of the two springs 51, 52 in the spring assembly 13 can be tailored to provide a wide variety of different biassing actions. It will also be appreciated that the spring assembly 13 could take other forms, for example by incorporating more than two springs, or possibly by consisting of a single spring with a non-linear spring rate.

The invention claimed is:

1. A proportional valve comprising:
an input port and an output port;
a diaphragm provided between the input port and the output port,
a diaphragm plate mounted to the diaphragm, the diaphragm plate having a pilot orifice formed therethrough;
a solenoid comprising an armature and a field winding, the armature being movable in a first direction response to a magnetic field generated by the field winding,
biasing means arranged to provide a biasing force to the armature in a direction opposite to said first direction, wherein in the absence of current in the solenoid, the biasing force is arranged to urge the armature to position the diaphragm plate in a main orifice between the input port and the output port to block the flow of fluid therebetween, with the armature blocking the pilot orifice,
wherein movement of the armature in said first direction in response to a magnetic field generated by the field winding opens the pilot orifice to allow fluid to flow therethrough, and allows the diaphragm plate to move out of the main orifice to create a gap therebetween allowing flow of fluid from the input port to the output port,
wherein said biasing means is arranged to exert a variable force on the armature over at least part of its travel,
wherein said biasing means includes at least two coiled compression springs, with one configured to sit axially within the other, and
wherein said at least two springs are arranged to exert a biasing force on the armature at different stages during the travel of the armature.

2. A proportional valve is claimed in claim 1, wherein the biasing means provides different rates of biasing force over at least two stages of travel of the armature.

3. A proportional valve as claimed in claim 1 wherein a first one of said springs acts on the armature before the other and is of a lower spring stiffness.

4. A proportional valve as claimed in claim 3 wherein said first spring is of greater length than the other.

5. A proportional valve as claimed in claim 1, further comprising a control chamber, wherein said diaphragm is provided between the input port and said control chamber.

6. A proportional valve according to claim 5, wherein the pilot orifice has a diameter adjacent the control chamber of less than 0.8 mm.

7. A proportional valve according to claim 5, wherein the pilot orifice has a first section proximate the control chamber and a second section distal from the control chamber, wherein the diameter of the first section is less than the diameter of the second section.

8. A proportional valve according to claim 7, wherein the diameter of the second section is at least twice the diameter of the first section.

9. A proportional valve as claimed in claim 1 wherein said springs are of different spring stiffness.

10. A proportional valve according to claim 5, wherein the diameter of the pilot orifice adjacent the control chamber is 0.75 mm.

11. A proportional valve according to claim 5, wherein the diaphragm plate has a first side facing the control chamber and a second side facing the main orifice, wherein the second side has a generally frustoconical shape having a cone angle between 30° and 45°.

12. A proportional valve according to claim 11, further comprising a plurality of ribs provided on the curved surface of the frustoconical shape, each rib having a constant depth.

13. A proportional valve according to claim 5, wherein the biasing means is provided in a second chamber at the other end of the armature to the control chamber, the second chamber being in fluid communication with the control chamber.

14. A proportional valve according to claim 5, wherein the armature is cylindrical with a diameter of 7 mm.

15. A proportional valve according to claim 14, wherein the armature is arranged to move in a cylindrical guide tube having a cylindrical surface with a thickness of 0.75 mm.

* * * * *